United States Patent [19]
Zurfluh

[11] Patent Number: 5,110,194
[45] Date of Patent: May 5, 1992

[54] CONTROLLED FIBER-OPTIC SWITCH

[75] Inventor: Erwin A. Zurfluh, Feldmeilen, Switzerland

[73] Assignee: International Business Machines Corporation, Armonk, N.Y.

[21] Appl. No.: 534,088

[22] Filed: Jun. 6, 1990

[30] Foreign Application Priority Data

Jul. 31, 1989 [EP] European Pat. Off. ............ 89810584

[51] Int. Cl.$^5$ ............................................. G02B 6/36
[52] U.S. Cl. ...................................................... 385/16
[58] Field of Search .......................... 350/96.20, 96.13

[56] References Cited

U.S. PATENT DOCUMENTS 4,775,207 10/1988 Silberberg ..................... 350/96.13 X
4,946,236  8/1990 Dautartas et al. ............ 350/96.16 X

OTHER PUBLICATIONS

Toshiki I. Tanaka et al., "Simple and Reliable Optical Bypass Switch for Fiber-Optic Data Bus Application", 7th European Conf. on Optical Communication.

*Primary Examiner*—William L. Sikes
*Assistant Examiner*—Phan T. Heartney
*Attorney, Agent, or Firm*—Joscelyn G. Cockburn

[57] ABSTRACT

In a controlled fiber-optic switch for selectably connecting or disconnecting the ends of first (13) and second (11) optical fibers, guiding and holding elements (2) hold said fibers' ends in opposite position and define two alternative switching positions for the first fiber's end. By activating means (8, 20) lateral bending forces are applied to the first fiber (13). The first fiber's free end becomes switched by altering the fiber's effective length between its fixation (5) and its guiding and holding elements (2). Switching movement is controlled by a guiding aperture (9) for lateral guidance of the first fiber (13). The free fiber end of the first fiber (13) is located on one side of the aperture (9). A bendable portion of the first fiber is located and fixed on the other side of the aperture. In the connect position, the first fiber (13) is kept under residual axial stress against the opposite end of the second fiber (11). In an alternating switch arrangement, a pair of first fibers (13, 14) are crossing each other in the aperture (9). By lateral shearing movement, the free ends of both fibers exchange their positions in guiding grooves (6A, 6B). The advantage is substantial reduction of connection losses and of reflections with high bit-rate applications.

15 Claims, 8 Drawing Sheets

CONTROLLED FIBER-OPTIC SWITCH

BACKGROUND OF THE INVENTION

1. Field of the Invention

The present invention relates to a controlled fiber-optic switch for selectably connecting or disconnecting the ends of first and second optical fibers by lateral displacement of the first fiber's end between a "connect" position which is in opposition to the second fiber's end, and a second position in which both fibers are disconnected. The invention further relates to a method of operation of a fiber-optic switch.

2. Prior Art

In communication and computer systems using fiber-optic network, there is a need of occasionally interconnecting or connecting and disconnecting signal lines which may be represented by single optical fibers each. One of several possible applications could be for Local Area Networks (LAN) configuration.

Several switching devices for establishing selectable connections are already proposed. Fibers which are used for this application have a small cross-section of typically 125 $\mu$m with a core diameter of less than 10 $\mu$m for single mode, and less than 65 $\mu$m for multimode case. Therefore, switching can be accomplished by very small relative displacement of selected fibers' ends against others. For safe operation it is necessary to keep the fibers' ends in good relative axial alignment if they are in the 'connect' position. In order to allow easy mechanical displacement operation, the opposite ends of 'connected' fibers—according to the state of the art—are kept in a certain distance of typically a few $\mu$m. It was reported (P. G. Hale et. al.: Mechanical optical-fiber switch. Electronic Letters IEE Jul. 22, 1976, p. 148) that with this small distance the line's transmission losses are rather low. However, with extreme high bit-rates and longer distance applications which are now coming up, for example in the range of 1 to 2 GBit/s, monomode fibers must be used as optical transmission medium, requiring special lasers as light sources which have a high resonance gain and which do not generate side modes. Useful lasers (e.g. index guided lasers or distributed feedback (DFB) lasers) are increasingly sensitive to back-reflected light which interferes with the electro-optical laser cavity operation. In an attemp to further reduce back-reflection and transmission losses between fiber ends, it was proposed to apply a clear liquid between opposite fiber ends. Liquids, however, are highly unwanted in field operation because most known optical liquids do not have sufficient optical stability over several years, especially when they become exposed to high temperatures or frequent alterations in ambient conditions.

SUMMARY OF THE INVENTION

It is an object of the present invention to improve optical-fiber switches by further reducing back-reflection and transmission losses between fiber ends. Another object is to improve safe and reliable operation by always attaining equal optical conditions at the connecting area during switching operations. A further object is to improve general reliablity of the device if used under rough field conditions, over a lifetime which can be compared to the lifetime of the optical fibers itself.

The controlled fiber-optic switch in accordance with the invention comprises guiding and holding elements for holding said opposite fibers' ends in position and for defining two alternative switching positions for the first fiber end. A guiding aperture is provided for lateral guidance of said movable first fiber, with its free fiber end being located on one side of said aperture, and a bendable portion of the fiber being located and fixed on the other side of said aperture. Activating means are arranged for applying lateral bending forces on said bendable portion of said first fiber, thereby altering the first fiber's effective length between its fixation and its original fiber end position within said guiding and holding elements and switching the first fiber's free end between said "connect" and "disconnect" positions within said guiding and holding elements. In a further step, the bending forces are reduced or repealed, whereby the effective length of the first fiber is again extended until said ends of opposite first and second fibers are pressed into tight physical contact.

The major advantage of this switching device is a substantial reduction of connection losses and reflections in mechanically switched fiber links, by providing direct physical contact between fiber ends which minimizes fresnel loss and back-reflection. This allows to operate high performance lasers, such as index guided lasers or DFB (Distributed Feed Back) lasers, in order to obtain a high bandwidth-distance product over a monomode fiber. The physical switch contact is made within a hermetically sealed housing, which can be a glass tube with an inert gas filling.

Details of embodiments and further advantages of the invention will become apparent from the following detailed description, with reference to the drawings which show:

DESCRIPTION OF THE PREFERRED EMBODIMENT

Figure 1A:
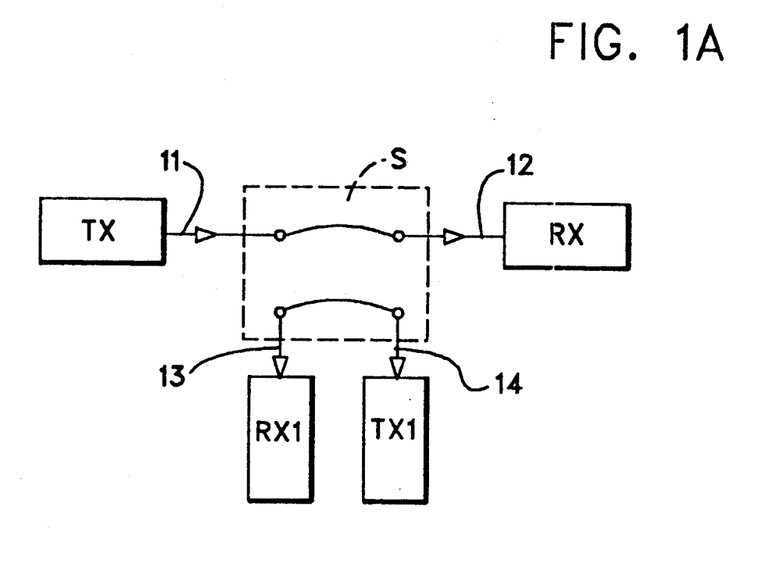
FIG. 1A: a communication network switch S in a first switching position.
Figure 1B:
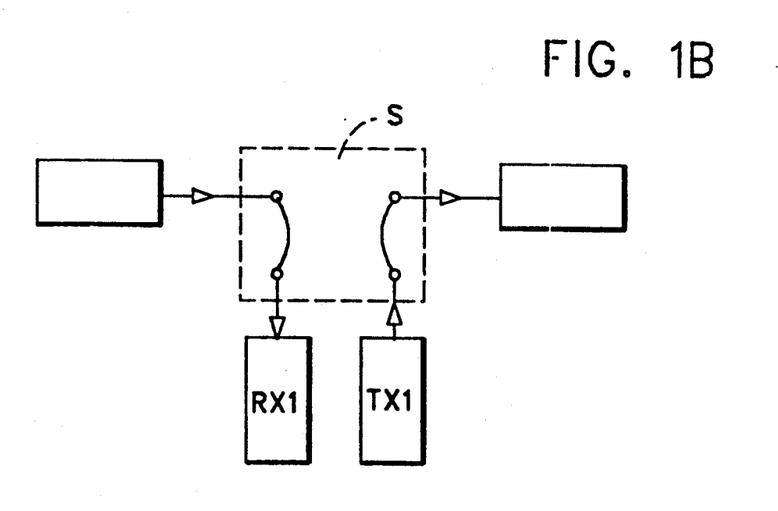
FIG. 1B: switch S in a second switching position.

FIGS. 1A and 1B schematically show a switch S as a first embodiment of the invention. Switch S is an element of a two-way communication line network for connecting a first pair of fibers to another pair of fibers. The 2×2 switch as shown can serve for either inserting or bypassing a station in a local area network. Elements of this network are transmitter station TX and receiver station RX which are connected to switch S by incoming fiber 11 and outgoing fiber 12, respectively. A local station comprises a local receiver RX1 and a local transmitter TX1. The local station is connected to switch S by a second pair of fibers, comprising a local station's incoming fiber 13 and the local station's outgoing fiber 14.

FIG. 1A represents the bypass mode for remote test operation of the communication line and its connections. With the same configuration, the local station can be run under self-test condition before the local receiver RX1 and the local transmitter TX1 will become connected to the network.

After successful completion of the test operation, switch S is activated to switch into the on-line configuration or the insetion mode according to FIG. 1B, with the station's transmitter TX1 and receiver RX1 switched on line. In this configuration the station's receiver RX1 is connected to the network's transmitter TX and the station's transmitter TX1 is connected to the network's receiver RX.

Relating to FIGS. 3–7 of the drawings, the design of switch S and its operation now will be explained in detail. The drawings are only schematics and they are not to a scale. Instead, the scale normal to the main axis X—X of the device is stretched for better understanding.

Both aforementioned fibers 11 and 12 enter switch S on holding and positioning block 2 which is mounted into a glass tube body 1. The glass tube is hermetically sealed and it may be filled with an inert gas. All moving and exposed parts of the switch are thereby protected against negative ambient influence. Both fibers 11 and 12 are fixed within block 2 by two fiber guidance holes 3A and 3B. The holes are arranged with their axes crossing each other. Within the holes, the fibers are guided in a kink. More to the center of the housing 1, said fibers 11 and 12 enter into a common diamond shaped opening 4 within block 2, the opening having V-shaped grooves 6A, 6B, as best can be seen from cross-section A—A in FIG. 4. Said kink together with a certain elasticity of the fibers, keeps the fibers accurate and well defined within the V-shaped grooves 6A, 6B, respectively.

Said second pair of fibers 13, 14 enter the glass tube 1 at the tube's opposite end, through a scaled fixation 5. Both second fibers then pass a pivot plate 9 (FIG. 5) which is positioned in relative proximity to diamond shaped opening 4. The ends of the second pair of fibers 13, 14 are also kept accurate and well defined in V-shaped grooves 6A, 6B of the opening 4, aligning them in an opposite position to the ends of the first pair of fibers 11, 12.

Each fiber 13, 14 of the second pair is connected to a kind of linear motion generating device. Resulting lateral displacements of the fibers are in opposite directions transversing the fibers' axes. The motors of the present example are realized by two magnetized plates having equal magnetic polarization, with its N-S (North-South) directions crossing the axes of fibers 13, 14. The plates are hold into position and guided by elastic steel blades 10 which are fastened within said fixation block 5.

Figure 6:
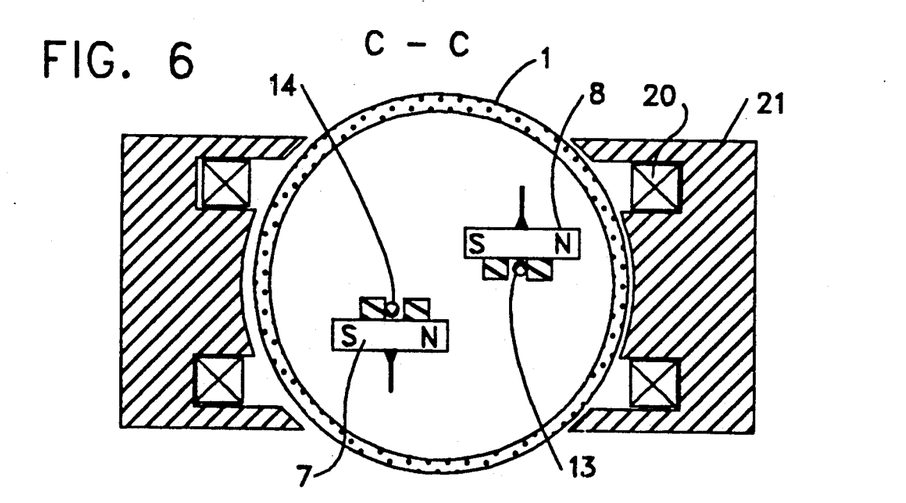
FIG. 6: section C—C in accordance with FIG. 2.

Within the N-S axis of magnetic polarization of said plates 7, 8 but outside the glass tube 1, external magnetic coils 20 are mounted comprising metal cores 21 (FIG. 6). The windings of the coils 20 are activated by switch control signals in the form of variable currents which produce variable magnetic fields. Activated by these external fields, the inner magnetized plates 7, 8 are moved in a direction corresponding to the direction of the applied current. Catched by clamping pins 17, 18 which are attached to the magnetized plates 7, 8 the fibers 13, 14 are forced to move in a scissors-like movement when the plates 7, 8 are moved.

The second fibers 13, 14 have a greater length than would be necessary to establish the shortest connection between their fixation 5 and the end position within the grooves 6A, 6B. In view of this excess length, the second fibers 13, 14 are always bent to a certain amount. As a result, when their ends exactly match the ends of the opposite fibers 11, 12 there is a minimal axial stress within fibers 13, 14 which is directed onto the opposite ends of fixed fibers 11, 12 within grooves 6A, 6B. This permanent axial stress ensures that pairs of opposite fiber ends always are in direct physical contact to each other. This kind of surface coupling significantly reduces loss of optical energy, typically to values in the range of 0.1 db for multimode and 0.25 db for monomode fibers. Further, the amount of back-reflected light is reduced to a level which is 30 db lower than the level of the transmitted signal.

Figure 7A:
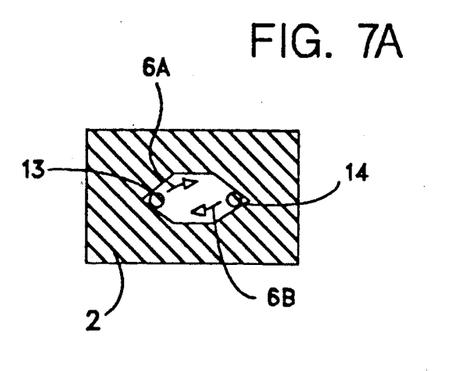
FIGS. 7A: to 7H several stages of the switching operation of a switching device according to FIG. 2, FIG. 8: a coil-current vs. time diagram.
Figure 7B:
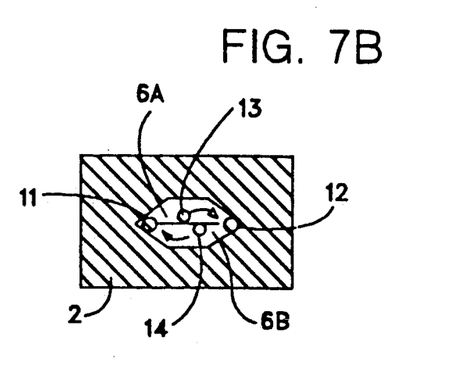

In FIGS. 7A to 7H four typical stages of switching operation are shown. By applying control current of a first direction to coils 20, a repelling magnetic field is generated which moves both magnetic plates 7, 8 in the direction to the center line X—X of the switching device. Both fibers 13, 14 "rotate" against the pivot plate 9 (FIG. 7A) and snap out of the groove 6A, 6B (FIG. 7B).

Figure 7C:
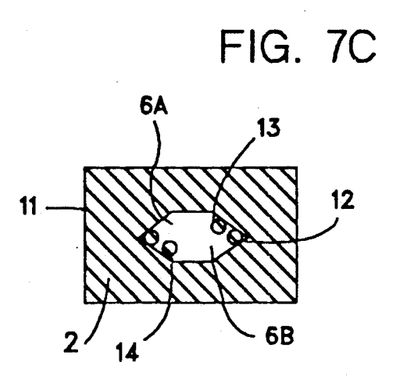
Figure 7D:
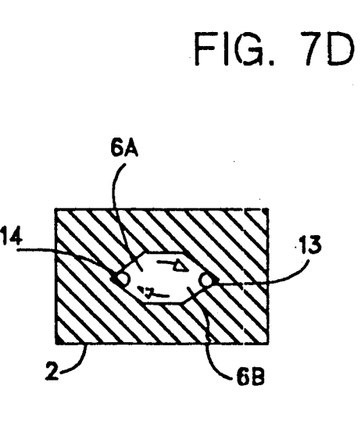
Figure 7E:
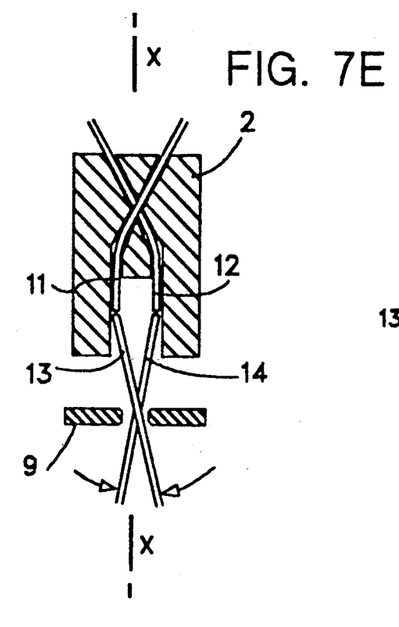
Figure 7F:
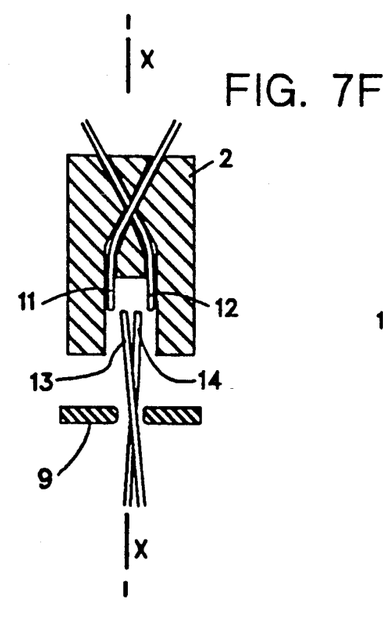
Figure 7G:
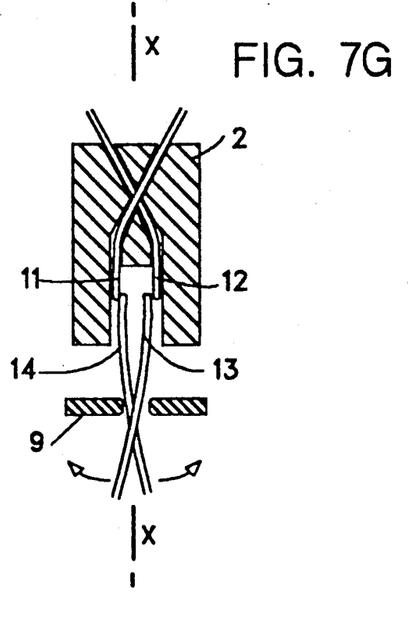
Figure 7H:
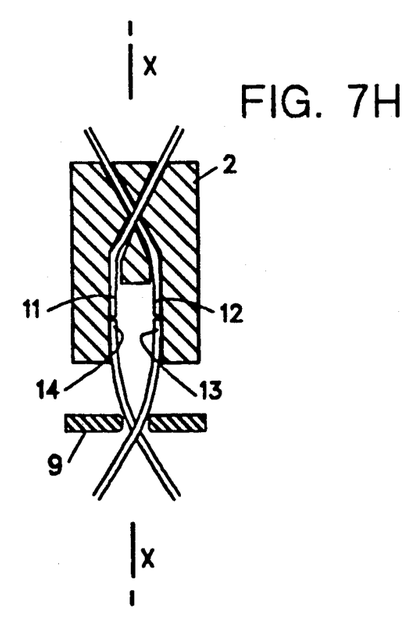

When the magnetized plates 7, 8 are further moving to the center of tube 1, the external control current is switched off and the repelling field decreases. By mass inertia of the plates and by the energy of repelling field between plates 7, 8, the fibers 13, 14 then cross the center line X—X as shown in FIG. 7C. From this figure, the fibers' position due to its excess length becomes apparent. Just before fibers 13, 14 reach the position of FIG. 7C, an external attracting magnetic field is generated from coils 20, by applying a respective current or "control signal". The increased deviation of the fibers reduces its apparent length against the ends of fixed fibers 11, 12. By this effect, the fiber ends of the flexible fibers 13, 14 will be pulled back into the V-shaped grooves 6A, 6B. The fiber ends really jump or switch into the grooves (FIG. 7D).

Figure 2:
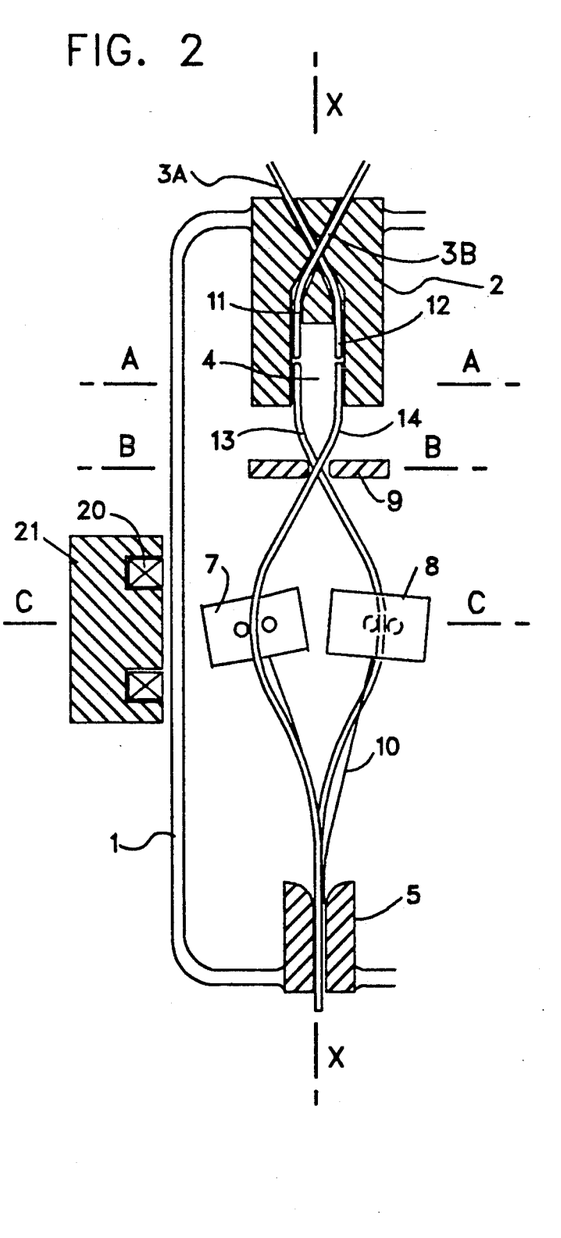
FIG. 2: a cross-section of a preferred embodiment of the invention.
Figure 3:
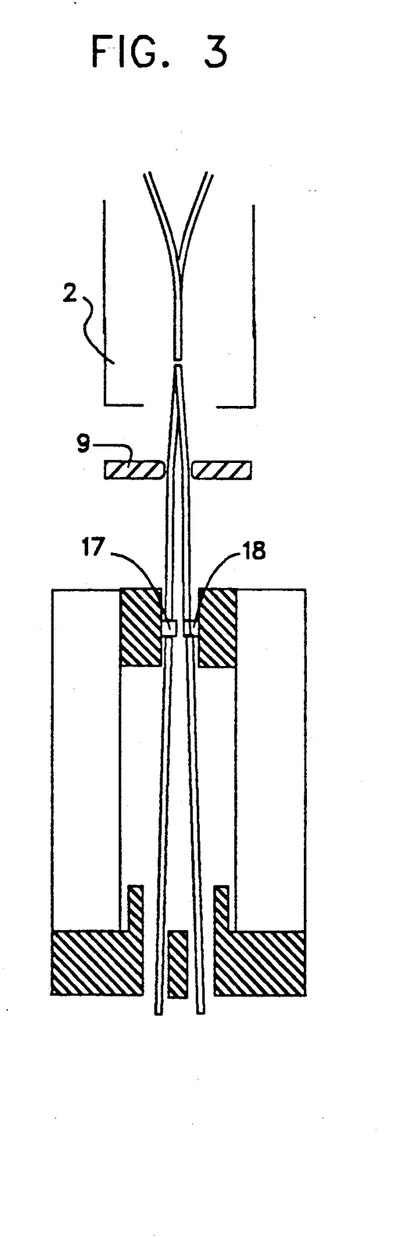
FIG. 3: a side-view of the device according to FIG. 2.
Figure 4:
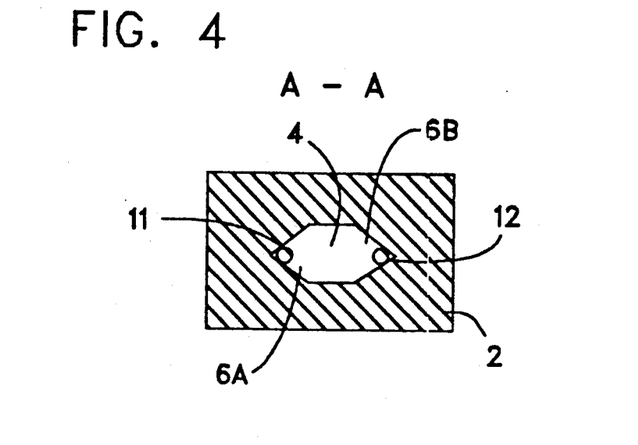
FIG. 4: section A—A in accordance with FIG. 2.
Figure 5:
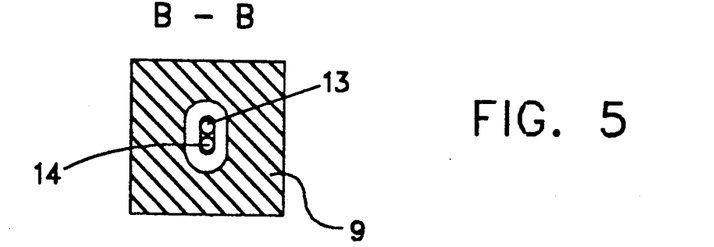
FIG. 5: section B—B in accordance with FIG. 2.

Finally, the external field is gradually switched off and the magnetized plates 7, 8 are adjusted in such a way that a small attractive force will reside in their final position. This force keeps the fiber ends under slight pressure against each other, as mentioned above. The movable fibers 13, 14 will now be kept in their interchanged positions and in a curvature as schematically shown in FIG. 2. The polarization of the magnetized plates 7, 8 guarantees that the two fibers are always kept in opposite curvatures and in a bistable switching mode, until a next switching operation will be initiated by again applying a control signal to coils 20.

Figure 8:
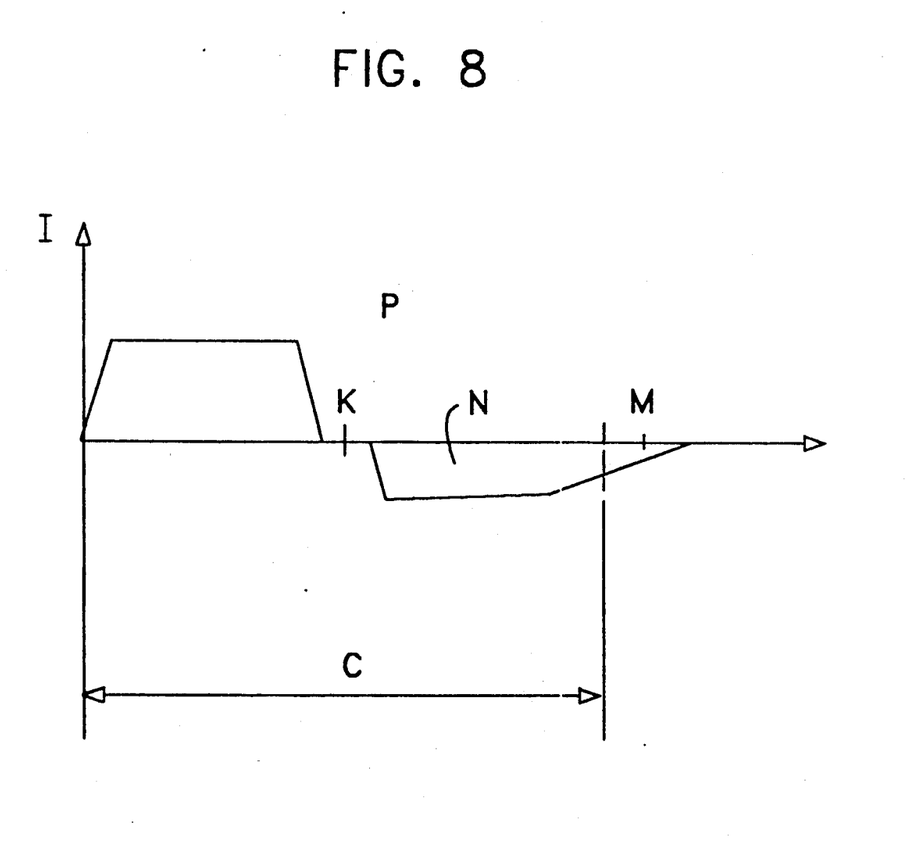
Figure 9:
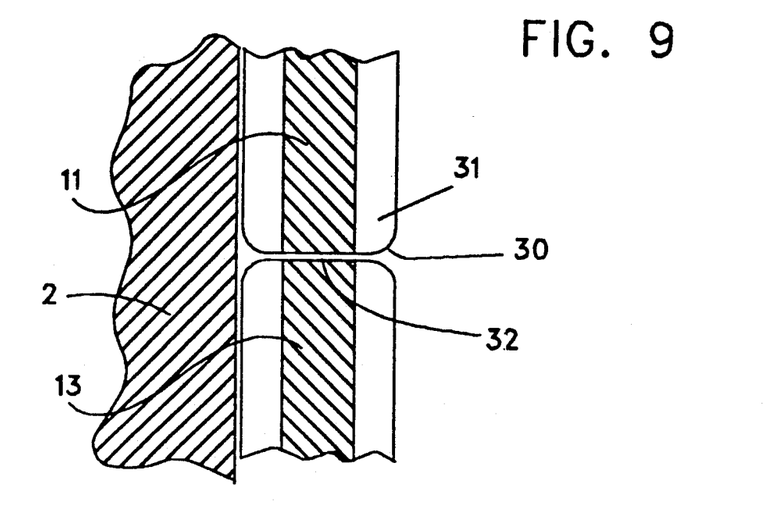
FIG. 9: a multimode fiber's ends ideal position.

The coil current vs. time diagram during a complete switching cycle is shown in FIG. 8. Both coils 20, each activating one of the magnetic plates 7, 8, are connected in series and are energized simultaneously. The applied positive current I creates a repelling field P. At time K the magnetic plates 7, 8 are crossing the center line X—X. An opposite current produces an attracting field N which begins to decrease at the end of the switching cycle C. At time M the ends of fibers 13, 14 are in their final switched position and in direct contact with the ends of opposite fibers 11, 12.

Although motion generating devices have been shown as electromagnetic devices, any other suitable arrangement for controlled generation of linear motion can be used. Electrostatic, hydraulic or pneumatic elements may be adapted for this purpose.

In order to improve easy and smooth movement of the fiber ends which are exposed to high mechanical stress, a special shaping and coating of the fibers may be provided as indicated in FIGS. 9 to 12. According to FIGS. 9 and 10, cladding 31 of multi-mode fibers 11 and 13 is provided with rounded edges 30 at the ends of the fibers. When the switch is in its stable position, the cores of opposite fibers 11, 13 are in direct physical contact by its faces 32. The well defined positions of the fibers' ends within the diamond-shaped guide openings 4 keep opposite fiber ends strictly aligned to each other. This is also the case with mono-mode fiber ends of FIGS. 11 and 12 where the faces 32 of the fiber's core and its cladding have spherical form, which was made by grinding, for example.

Figure 10:
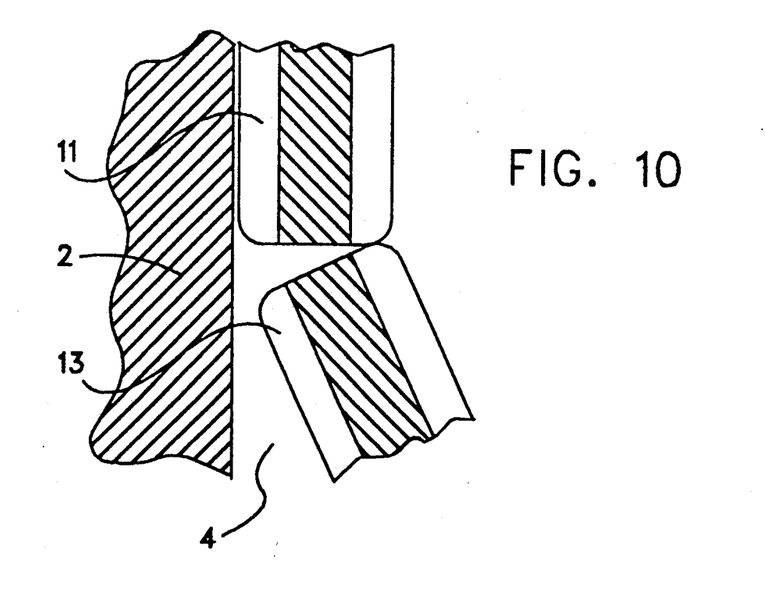
FIG. 10: a most critical situation with a fiber of FIG. 9 lifted.
Figure 11:
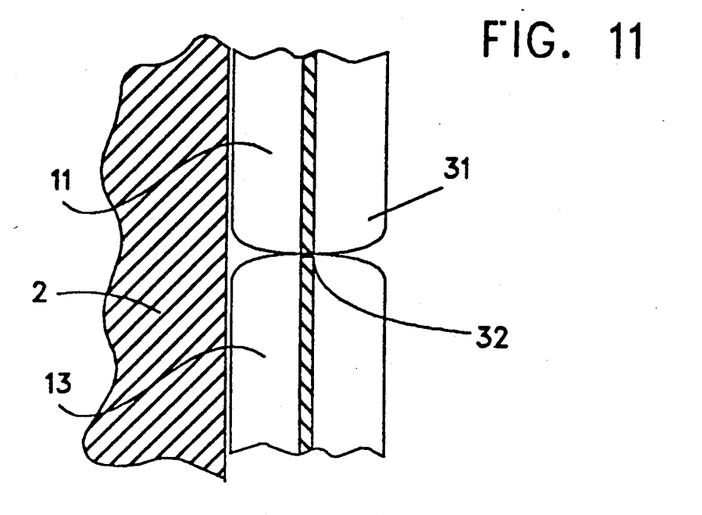
FIG. 11: monomode fibers' ends ideal position.
Figure 12:
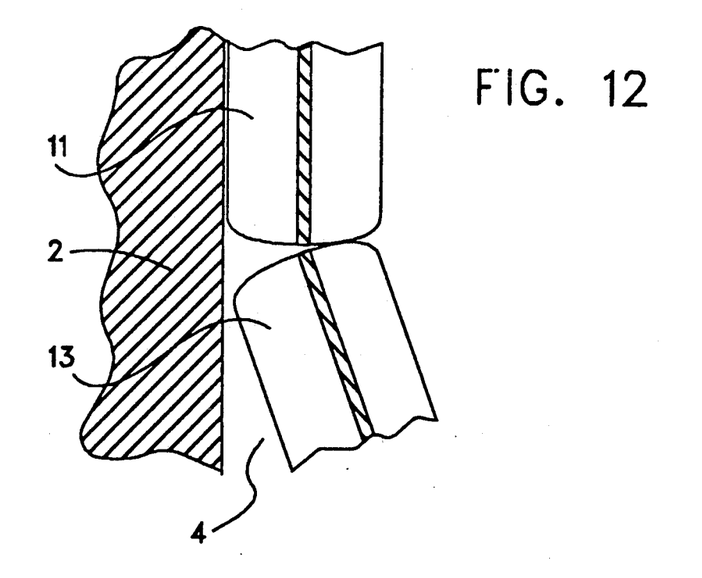
FIG. 12: a critical situation with a monomode fiber lifted.

FIGS. 10 and 12 show the situation of the fiber ends under excess bending at the beginning of a switching operation. As will be realized from the figures, there is no shearing or other mechanical stress on the core of the fibers. Excessive bending of the fibers 13, 14 by activated plates 7, 8 let the fiber ends glide away in axial direction, from the opposite fibers' 11, 12 ends. Only then the fibers are forced to interchange their positions within diamond-shaped opening 4, and the moving fibers 13, 14 roll against the cladding's outer rounded edges. The result is a soft switching movement without affecting mechanical or optical qualities of the fibers by switching operations during lifetime of the switching device.

An effect which would reduce mechanical resistance of unprotected parts of the fibers over time, is OH-Ions diffusion. From literature, this process is called Stress Corrosion Cracking. In order to avoid this effect, it was already proposed to apply a special coating, for example a Titanium-Carbide (TiC) coating of the fibers, which may be applied by chemical vapour deposition. Mechanical stability can further be enhanced by providing a carbon film between the fiber and the TiC coating.

In avoiding the above problem, encapsulation of the critical parts of the fibers according to the invention, by glas tube 1 and the abundance of OH-Ions in an inert gas filling of the hermetically sealed tube, prevents any OH-Ions diffusion. It is no longer necessary to coat fiber parts against OH-Ions diffusion effect. Only for additional mechanical stability of the fiber ends against mechanical wearing, it may be advantageous to coat the rounded fiber ends only with a material which enhances mechanical stability. The core's area is kept free from any coating, for undisturbed light transmission between opposite fiber ends.

By combination of this coating with the above described protection against OH-Ions diffusion, by encapsulation and exposure of the fiber ends to an inert gas, excellent long-time stability of the switch is achieved.

Although the switching device was described as a 2×2 connecting switch, alternating switching devices or IN/OUT switches can be realized in a simplified design, for example with only a single movable fiber which then will be switched between a stationary opposite fiber end and an open (not connected) stationary fiber end position.

I claim:

1. Method of operating a fiber-optic switch, having means for switching a first fiber's (13) end between two positions with respect to a pair of second fibers' (11, 12) ends, all said fiber ends being positioned in guiding holding element (2), and control of motion activating means (8, 20) for applying lateral bending forces on said first fiber (13) comprising the steps of:
   applying lateral bending forces on said first fiber (13) until its free end switches out of its first position opposite one of said second fibers' (11, 12) ends into its new position, by activating said motion activating means (8, 20);
   reducing the effective length of said first fiber between its fixation (5) and its free end when it is in its new position, by keeping said motion activating means (8, 20) activated; and
   reducing or repealing said lateral bending forces, by deactivating said motion activating means (8, 20), thereby extending the effective length of said first fiber (13) until its free end is pressed due to excessive length in said first fiber into contact with the opposite end of respective second fibers' (11, 12) end in said new position.

2. Controlled fiber-optic switch for selectably connecting or disconnecting the ends of first (13) and second (11) optical fibers by lateral displacement of the first fiber's end between a connect position which is opposite the second fiber's end, and a disconnect position in which both fibers (11, 13) are disconnected, comprising
   said first fiber (13) having a length greater than is required to establish the connection between a fixation point and its free fiber end whereat contact is made with the free fiber end of the second fiber;
   guiding and holding elements (2) for holding said fibers' ends in opposite position and for defining two alternative switching positions for said first fiber's end, and further comprising means for applying lateral moving forces to said first fiber, characterized by:
   a guiding aperture (9) for lateral guidance of said first fiber (13), with its free fiber end being located on one side of said aperture, and a bendable portion of the fiber being located and fixed on the other side of said aperture;
   motion activating means (8, 20) for applying lateral bending forces to said first fiber (13), and switching said first fiber's free end by altering the first fiber's effective length between its fixation (5) and said guiding and holding elements (2) and holding, in the connect position, said first fiber against said opposite end of said second fiber (11) under residual axial stress caused by excess length of the first fiber (13).

3. Switch according to claim 2, characterized in that said motion activating means comprise polarized magnetic elements (7, 8) which are attached to said movable first fibers at their bendable portions, and further comprise corresponding controlled electromagnetic linear motor elements (20, 21).

4. Switch according to claim 3, characterized in that magnetic polarization of said polarized magnetic elements (7, 8) is in a common direction which ensures under all conditions opposite bending of a pair of movable first fibers, in a bistable mode.

5. Switch according to claim 3 or 4, characterized in that said polarized magnetic elements (7,8) are guided by elastic blade elements (10) in the direction of lateral movement of said movable first fibers.

6. Switch according to claim 2, characterized that all moving parts are hermetically sealed within a housing (1) and that controlled electromagnetic elements (20, 21) which are part of said activating means are arranged outside said housing.

7. Switch according to claim 2, characterized in that said guiding and holding elements (2) comprise a diamond shaped opening (4) for receiving said fixed second fiber's end and for perfect opposite alignment with said first fiber's free end.

8. Switch according to claim 2, characterized in that the cladding (31) of first and second fibers (11, 13) is provided with rounded edges (30) at the ends of the fibers.

9. The switch according to claim 6 wherein the housing is filled with inert gas.

10. Controlled fiber-optic switch for selectably connecting or disconnecting the ends of first (13) and second (11) optical fibers by lateral displacement of the first fiber's end between a connect position which is opposite the second fiber's end, and a disconnect position in which both fibers (11, 13) are disconnected, comprising guiding and holding elements (2) for holding said fiber's ends in opposite position and for defining two alternative switching positions for said first fiber's end, and further comprising means for applying lateral moving forces to said first fiber, characterized by:

a third fiber (14) having its fiber end located in opposite location to the first fiber's end;

a guiding aperture (9) for lateral guidance of said first fiber (13), with its free fiber end being located on one side of said aperture, and a bendable portion of the fiber being located and fixed on the other side of said aperture;

motion activating means (20, 21, 7, 8) for applying lateral bending forces to said first fiber (13), and switching said first fiber's free end by altering the first fiber's effective length between its fixation (5) and said guiding and holding elements (2) and holding, in the connect position, said first fiber under residual axial stress against said opposite end of said second fiber (11); or for applying opposite lateral bending forces on the first fiber and the third fiber to move them in opposite lateral directions, thereby forcing said first fiber and third fiber into a scissors-like movement which leads the ends of both the first fiber and the third fiber to exchange their positions within said guiding and holding elements (2).

11. The controlled fiber-optic switch according to claim 10, said switch further comprising permanent magnetic elements (7,8) coupled to the first fiber and the third fiber respectively;

electromagnetic means, including electromagnetic coils (20), operatively coupled to the permanent magnetic elements said electromagnetic means responsive to (a) application of a control current of a first direction to said coils (20) for moving said fibers against each other at their movable portions, (b) stop moving said fibers when the control current is switched when said fiber portions are crossing each other or just before this crossing occurs, and (c) application of a control current of opposite direction for generating an external attracting magnetic field which increases deviation of said fibers and reduces their apparent lengths such that the fiber ends slide into alternate V-shaped grooves (6A, 6B) of said guiding and holding element (2).

12. Optical fiber switch for making a selectable optical connection between the fiber ends of a first (11, 12) and a second pair (13, 14) of optical fibers, the end portions of the two fibers of the first pair being in fixed positions, and the free end portions of the two fibers of the second pair being movable with respect to the end portions of the fibers of the first pair, said switch comprising said second pair (13, 14) of optical fibers having excessive lengths with a bendable section in each fiber;

two opposite guiding grooves (6A, 6B) forming end positions for the two free fiber ends of said first pair (11, 12);

a guiding aperture (9) for guiding the two fibers of said second pair, the free fiber ends of both fibers being located on one side of said aperture between said guiding grooves, and the bendable portion of each fiber being located on the other side of said aperture;

said two fibers of said second pair crossing each other in said guiding aperture (9), each fiber having a bent which forces is free end within said guiding groove in axial direction against the opposite end of a respective fiber of the first pair of fibers; and means for exercising lateral forces on said bendable portions such that said two fibers of said first pair making a shearing movement and said free fiber ends exchange their positions is said guiding grooves (6A, 6B).

13. A improved optical fiber switch for selectably connecting or disconnecting the ends of at least a first optical fiber and a second optical fiber comprising:

a housing for supporting components of said optical fiber switch;

a first holding and positioning means mounted in said housing; said holding and positioning means having at least one guidance hole terminating in a coupling section which defines a connect and disconnect position for the ends of at least the first optical fiber and the second optical fiber;

at least a first optical fiber mounted in said hole with its free end and fixedly positioned within the coupling section;

a second holding and positioning means mounted in said housing in spaced relationship to the first holding and positioning means; said second holding and positioning means including a guiding plate with a guiding aperture therein positioned in relative proximity to the coupling section;

at least a second optical fiber threaded through the aperture; said second optical fiber having a length greater than is required for its free end to contact the free end of the first optical fiber in the coupling section; and a motion activating means coupled to said at least second optical fiber; said motion activating means applying lateral forces to said at least the second optical fiber to cause its free end to move and remain in firm contact with the free end of the at least said first optical fiber under residual axial stress exerted by the excessive length of the second optical fiber.

14. The improved optical fiber switch of claim 13 wherein the housing is hermetically sealed.

15. The improved optical fiber switch of claim 14 wherein the housing is filled with inert gas.

* * * * *